United States Patent [19]
Tada

[11] Patent Number: 5,879,256
[45] Date of Patent: Mar. 9, 1999

[54] HYDRAULIC TENSIONER HAVING A PISTON WITH A PRESSURE RELIEF VALVE AND GROOVED TIP

[75] Inventor: Naosumi Tada, Nabari, Japan

[73] Assignee: Borg-Warner Automotive K.K., Japan

[21] Appl. No.: 853,836

[22] Filed: May 9, 1997

[30] Foreign Application Priority Data

May 10, 1996 [JP] Japan ................................. 8-140650

[51] Int. Cl.$^6$ ................................. F16H 7/22; F16H 7/08
[52] U.S. Cl. ................................. 474/110; 474/111
[58] Field of Search ................................. 474/91, 101, 109, 474/110, 111, 113, 114, 115, 116, 117, 133, 134, 135, 136, 137

[56] References Cited

U.S. PATENT DOCUMENTS

| | | | |
|---|---|---|---|
| 4,507,103 | 3/1985 | Mittermeier | 474/110 |
| 4,826,470 | 5/1989 | Breon et al. | 474/110 |
| 4,881,927 | 11/1989 | Suzuki | 474/110 |
| 4,981,460 | 1/1991 | Ojima | 474/111 |
| 4,997,411 | 3/1991 | Breon et al. | 474/110 |
| 5,073,150 | 12/1991 | Shimaya et al. | 474/110 |
| 5,117,786 | 6/1992 | Trzmiel et al. | 123/90.31 |
| 5,197,420 | 3/1993 | Arnold et al. | 474/110 |
| 5,259,820 | 11/1993 | Mott | 474/110 |
| 5,346,436 | 9/1994 | Hunter et al. | 474/110 |
| 5,366,415 | 11/1994 | Church et al. | 474/110 |
| 5,370,584 | 12/1994 | Todd | 474/110 |
| 5,563,651 | 10/1996 | Kawashima et al. | 474/110 |
| 5,577,970 | 11/1996 | Smith et al. | 474/110 |
| 5,597,367 | 1/1997 | Trzmiel et al. | 474/110 |
| 5,601,505 | 2/1997 | Tada | 474/110 |
| 5,606,941 | 3/1997 | Trzmiel et al. | 474/110 |
| 5,637,047 | 6/1997 | Schulze | 474/100 |
| 5,700,213 | 12/1997 | Simpson et al. | 474/110 |
| 5,707,309 | 1/1998 | Simpson et al. | 474/110 |

FOREIGN PATENT DOCUMENTS 1-58848  4/1989  Japan .

*Primary Examiner*—Charles A. Marmor
*Assistant Examiner*—Matthew A. Kaness
*Attorney, Agent, or Firm*—Sidley & Austin; Greg Dziegielewski

[57] ABSTRACT

A hydraulic tensioner having a piston with a pressure relief valve and grooved tip. The tensioner includes an oil passage that is formed in the piston, and that opens at the piston tip. The pressure relief valve is located in the oil passage, and the groove that connects to the opening of the oil passage is formed on the face of the piston tip.

4 Claims, 4 Drawing Sheets

HYDRAULIC TENSIONER HAVING A PISTON WITH A PRESSURE RELIEF VALVE AND GROOVED TIP

This invention relates to a hydraulic tensioner for a power transmission device. More specifically, this invention relates to a hydraulic tensioner having a piston with a pressure relief valve and grooved tip.

BACKGROUND OF THE INVENTION

A tensioning device, such as a hydraulic tensioner, is used to impart and maintain a certain degree of tension in the chain or belt that drives, for example, an engine camshaft. A hydraulic tensioner typically comprises a housing having a bore, and a piston having a rear end which is inserted into the bore of the housing. The piston is biased in a protruding or outward direction by a spring. A fluid chamber is formed by the inner wall surface of the bore and the rear end face of the piston. A fluid pressure source provides pressurized fluid through a passage in the housing to the fluid chamber.

When the tension of the chain or belt increases during engine operation, the piston receives a force in the retraction direction, and the fluid pressure in the fluid chamber also increases. If the force received by the piston is excessive the piston and housing may be damaged.

In conventional hydraulic tensioners, relief valves have been provided in the housing, and thus require enlargement of the housing. Also, typically, the tip of the piston tends to develop wear from its contact with the tensioner arm.

The present invention is directed to the above-described problems in conventional hydraulic tensioners, and provides a hydraulic tensioner which has a pressure relief valve that releases oil from the fluid chamber to the outside, conserves housing space, and reduces wear of the tip of the piston. When the fluid pressure in the fluid chamber exceeds a predetermined maximum, the pressure relief valve opens so that oil can discharge to the outside and lubricate the tip of the piston.

SUMMARY OF THE INVENTION

The present invention is directed to a hydraulic tensioner having a housing with a bore, a piston slidably received within the bore to form a fluid chamber, an oil passage within the piston, a pressure relief valve within the oil passage, and a groove formed on the outside face of the piston tip.

A first embodiment of the hydraulic tensioner of the present invention provides the above-described tensioner in which the oil passage has an opening face at the tip of the piston, and the oil passage is connected to the fluid chamber. A piston spring placed against the piston biases the piston in a protruding direction from the bore. A passage in the housing connects the fluid chamber with a source of fluid. The oil passage has a pressure relief between the fluid chamber and the piston tip. The pressure relief valve has a valve body seated against the opening face of the oil passage. When oil pressure in the fluid chamber exceeds a predetermined maximum, the valve body separates from the seat, overcoming the resistance of the valve spring, to permit oil to leave the passage through the clearance between the valve body and seat.

In a second embodiment, a hydraulic tensioner according to the first embodiment is provided wherein the valve body is positioned between a valve spring and the opening face of the oil passage.

In a third embodiment, a hydraulic tensioner according to the second embodiment is provided wherein the piston includes a cap member at the piston tip, and the valve spring is positioned between the valve body and the cap member.

In a fourth embodiment, a hydraulic tensioner according to the third embodiment further comprises a groove connected to an opening of the oil passage. The groove is formed on the outside face of the cap member of the piston.

For a better understanding of these and other embodiments of the invention, reference should be made to the following detailed description taken in conjunction with the accompanying drawings.

DETAILED DESCRIPTION OF THE PREFERRED EMBODIMENTS

Turning now to the drawings, FIGS. 1–8 depict various embodiments of this hydraulic tensioner invention having a piston with a pressure relief valve and a grooved tip.

Figure 1:
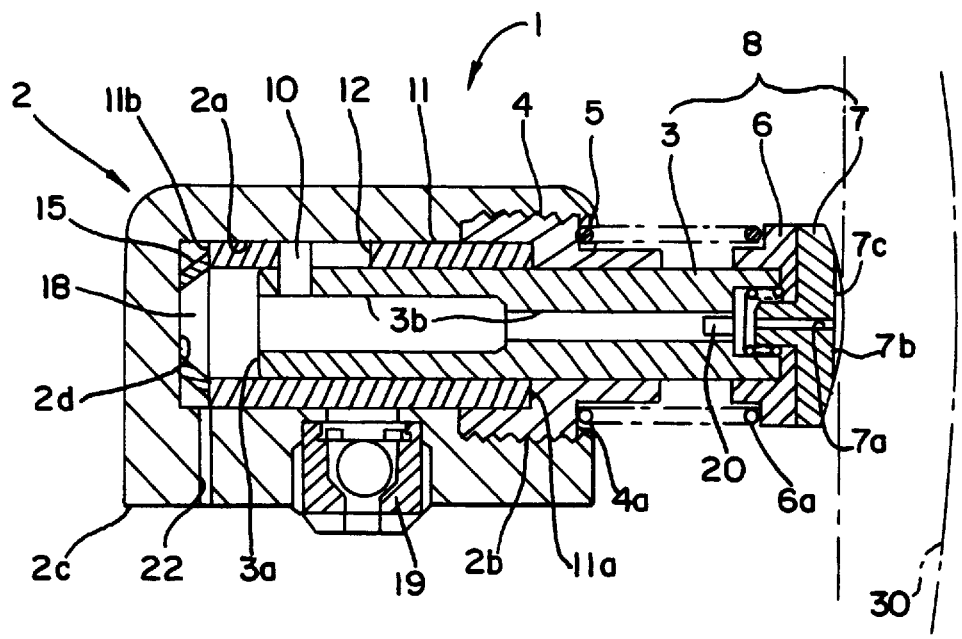
FIG. 1 is a front cross-sectional view of an embodiment of the present invention.

FIG. 1 illustrates one embodiment of the present invention. A hydraulic tensioner 1 has a housing 2 with a bore 2a that opens at one end. A piston 3 has a rear end which is inserted into the bore 2a. A support 4 slidably supports the piston 3, and threadedly engages with female thread 2b formed in the opening of bore 2a. The support 4 permits axial movement of the piston while restricting movement in the radial direction. A piston spring 5 biases the piston 3 in the protruding or outward direction from the bore. One end of the piston spring 5 pressure contacts the end face 4a of the support 4. A second end of the piston spring 5 pressure contacts the end face 6a of a cap 6 that is fixed to the tip of the piston. The cap 6 has a contact part 7 which contacts a tensioner arm 30.

A pin member 10 that protrudes from the outer periphery of piston 3 is attached to the rear end of the piston. A cylindrical sleeve 11 is located inside the bore 2a, and is slidably engaged to the outer periphery of the piston 3 to permit axial movement of the piston with respect to the sleeve. The sleeve is positioned for both rotational and axial movement with respect to the bore. An engagement aperture 12 with which the pin member 10 can engage is formed in the sleeve 11.

Figure 4:
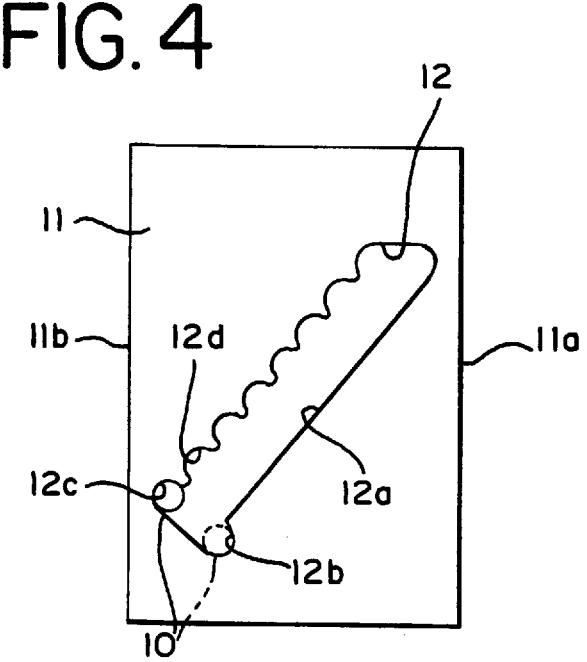
FIG. 4 is a partial sectional view of a sleeve of an embodiment of the present invention illustrating the rack cut out from the sleeve.

The engagement aperture 12, shown more clearly in FIG. 4, is a long hole that extends diagonally in the axial direction of the bore (left-right direction in the figure). The engagement aperture 12 has a straight inclined surface 12a. A cut out rack member 12b is formed on one end of the straight inclined surface 12a. The pin member 10 can detachably engage with the rack member 12b. Multiple rack members are cut out from the sleeve, such as 12c and 12d which are formed in a step-like manner on the opposite side of the straight inclined surface 12a. The pin member 10 can detachably engage with the multiple rack members as well to provide a rack and ratchet mechanism.

An elastic member 15 such as an elastic disc spring contacts the rear end face 11b of the sleeve 11 in the bore 2a of the housing 2. Other types of elastic members may be used, for example, a rubber member, Belleville or wave washer (wave-form washer), a rubber member bonded on the face of a flat washer, as well as resin, plastic or sponge members. A fluid chamber 18 is formed in the housing 2 by the inner wall surface of the bore 2a and the rear end face 3a of the piston. Fluid pressure from a fluid pressure source is supplied to the fluid chamber 18 through a check valve 19 located at the bottom of the housing 2. The fluid pressure source may be a reservoir, oil pump, or the like.

Figure 5:
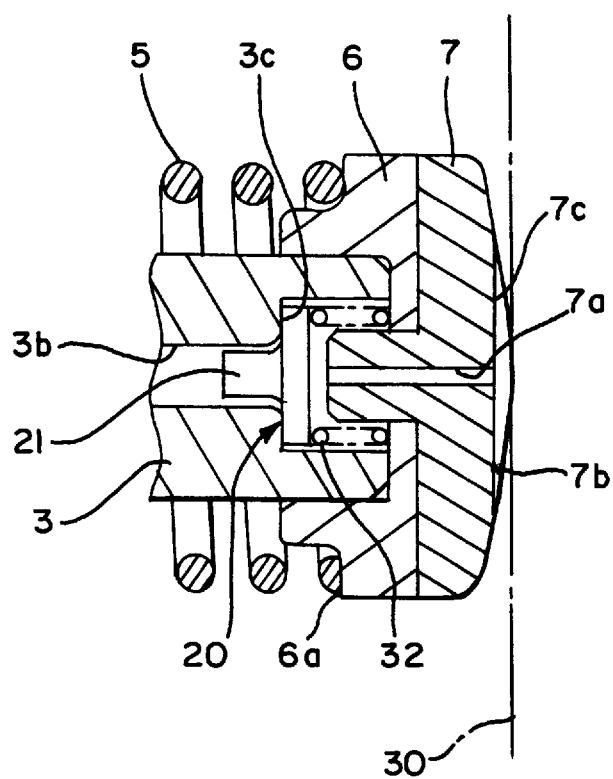
FIG. 5 is a partial sectional view of a portion of an embodiment of the present invention illustrating the pressure relief valve.

As shown in FIG. 5, a pressure relief valve 20 comprises a valve body 21 that is axially slidable, and is located in the oil passage 3b. A valve spring 32 biases the valve body toward the direction of close contact with an opening face 3c of the oil passage 3b. The opening face 3c serves as a seat for the valve body.

An oil passage 3b extends axially along the piston 3 and is connected to the fluid chamber 18. The pressure relief valve 20 opens when pressure exceeds a predetermined maximum in the oil passage 3b and allows fluid to exit through the opening on the front end of the oil passage 3b. Also, an oil passage 7a is formed in the cap or tensioner contact part 7, and it opens on the front and rear end faces of the contact part 7.

Figure 3:
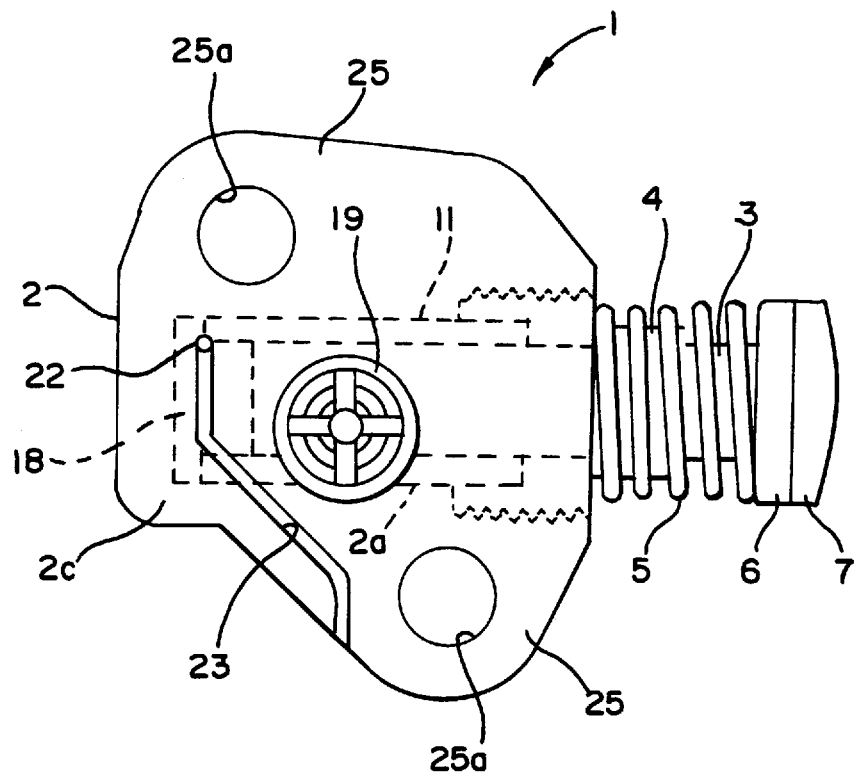
FIG. 3 is a rear plan view of an embodiment of the present invention illustrating the bore in phantom.

One end of an air vent channel 22 and 23, terminates at an opening or aperture 22 in the fluid chamber 18. A second end of the air vent channel terminates at an external attachment surface 2c of the housing 2. As shown in FIG. 3, the air vent channel may include a tortuous path 23 or a circuitous path with turns and directional changes, formed within the housing 2. The air vent channel permits the venting of air to the outside while limiting the flow of oil through the channel.

Figure 2:
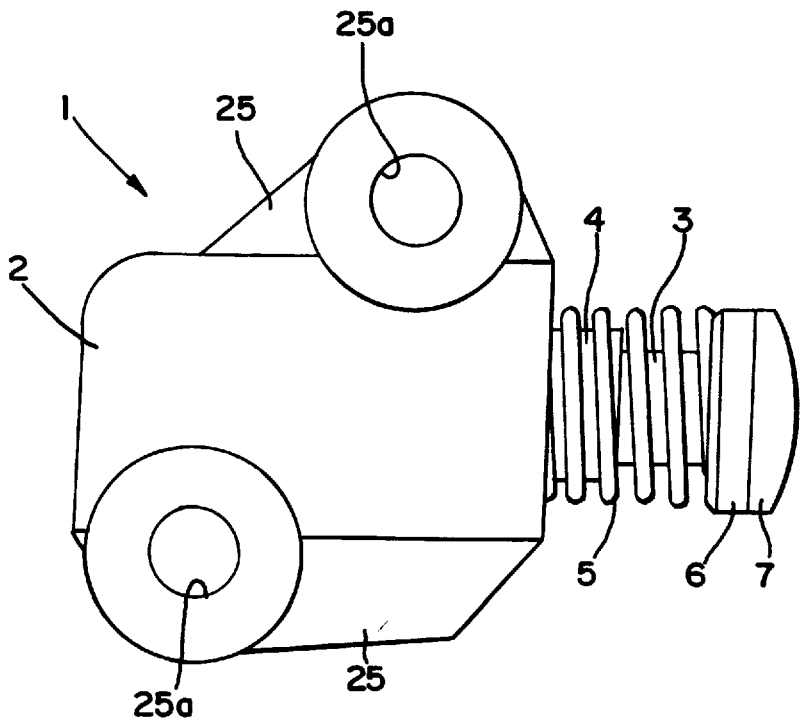
FIG. 2 is a front plan view of an embodiment of the present invention.

Also, an attachment aperture 25a is provided to the side portion 25 of the housing 2 to attach the hydraulic tensioner 1 to the engine block, as shown in FIGS. 2 and 3.

When the hydraulic tensioner 1 is installed in an engine, the pin member 10 is engaged with rack member 12b (FIG. 4, double-dotted line) at the bottom of the engagement aperture 12 by rotating and pushing piston 3 into the housing 2, so that the piston 3 is held in a compressed or retracted position. The hydraulic tensioner is then attached to the engine block or other mounting surface using a bolt inserted and fastened into the attachment aperture 25a.

After the bolt is fastened, the pin member 10 moves rearward in the engagement aperture 12 as contact part 7 at the piston tip is pushed in by the tensioner arm 30. The pin member thus engages with rack member 12c (FIG. 4, solid line), and the outward force of the piston 3 acts on the tensioner arm 30.

As the tension of the chain increases during engine operation, a force in the retracting direction acts on piston 3, the pin member, and the portion of the engagement aperture contacting the pin member, for example, rack member 12c in the engagement aperture 12.

Figure 7:
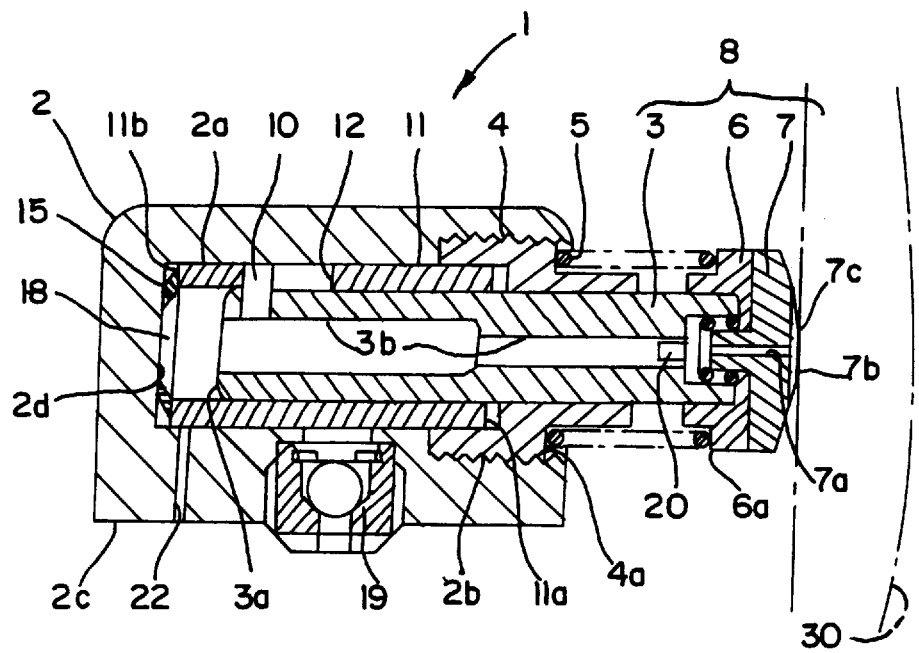
FIG. 7 is a partial sectional view that illustrates the operation of an embodiment of the present invention with the piston retracted.

As shown in FIG. 7, the elastic member 15 is located at the rear end 11b of the sleeve 11. The elastic member is compressed between the rear end 11b of the sleeve and the bottom face 2d of the bore. During the retraction of the piston, the pin member 10 contacts the engagement aperture 12 of the sleeve 11. The sleeve 11 retracts slightly due to the compression of the elastic member 15; thus, the elastic member absorbs the shock force acting on the sleeve 11

Figure 8:
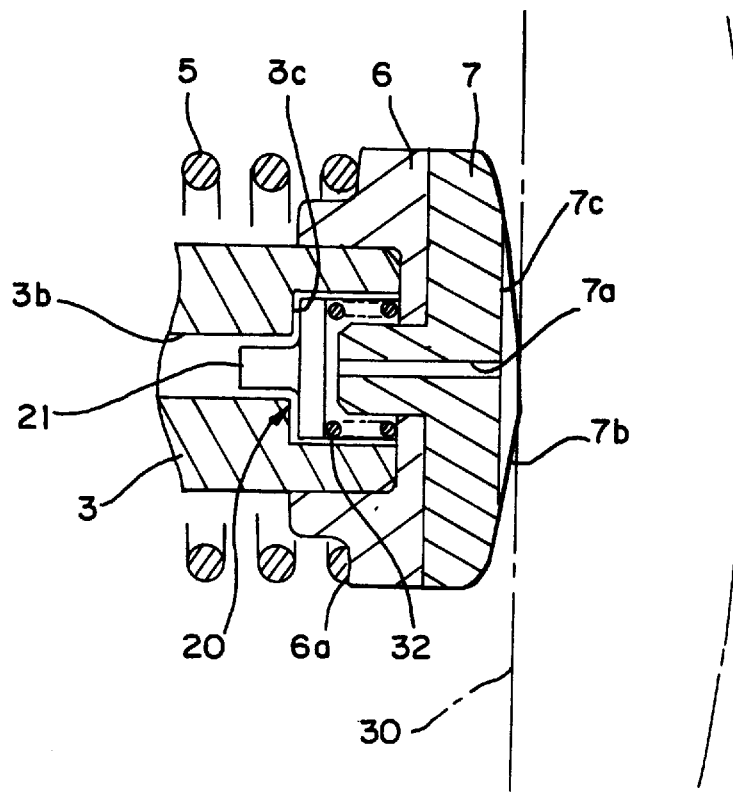
FIG. 8 is a partial sectional view of a portion of an embodiment of the present invention illustrating the pressure relief valve.

As shown in FIG. 8, when a force in the retracting direction acts on piston 3 and the fluid pressure in the fluid chamber 18 increases above a predetermined maximum, a valve body 21 of the pressure relief valve 20 moves in the axial direction against the spring force of a valve spring 32. As a result, a clearance is generated between the valve body 21 and an opening face 3c, and the pressure relief valve 20 opens. The oil in the fluid chamber 18 then moves through oil passage 3b and the clearance, passes through oil passage 7a in contact part 7, and discharges from an opening at the tip 7b of the contact face part 7. Thus, a pressure relief mechanism limits the accumulation of high pressure in the fluid chamber 18.

Since the oil passages 3b and 7a are formed in the piston body 3 and contact part 7, respectively, and the pressure relief valve 20 is located in oil passage 3b, housing space is conserved and enlargement of the overall housing is not required to accommodate the oil passages and pressure relief valve.

Also, when the pressure relief valve 20 opens, the oil in oil chamber 18 is discharged to the outside at the tip of the piston. Since this discharged oil lubricates the piston tip at its site of contact with the tensioner arm 30, the wear on contact part 7 is reduced.

Figure 6:
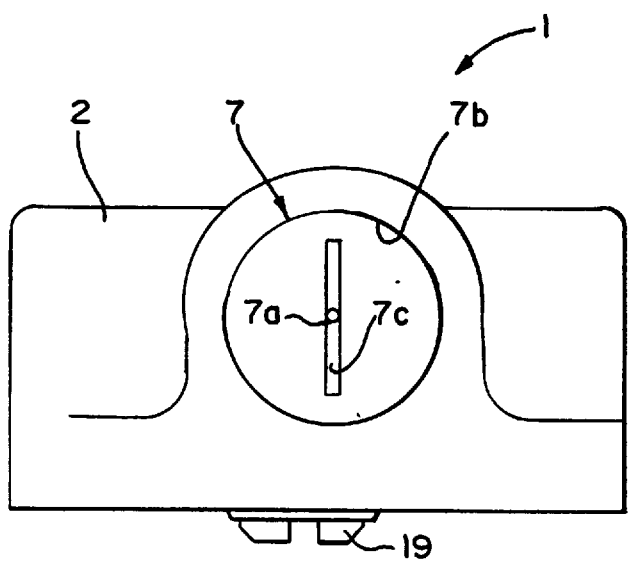
FIG. 6 is an end view of the piston tip of an embodiment of the present invention.

In addition, as shown in FIGS. 6 and 8, a groove 7c that connects to the open end of oil passage 7a is formed in the tip face 7b of the contact part 7. Because the groove is present, the opening of the oil passage 7a is not closed by the contact of the tensioner arm 30 with the tip face 7b of the contact part 7. Thus, the oil can discharge from the tip face 7b of the contact part.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore defining a central axis;

a piston slidably received in said bore, said piston and said bore forming a fluid chamber therebetween, said piston having a body portion and a cap portion fixed to said body portion, a first fluid passage formed through the center of said body portion of said piston along said central axis from said fluid chamber to said cap portion of said piston;

a first piston spring placed against said pistion cap portion to bias said piston in a protruding direction from said bore along said central axis;

a second fluid passage, said second fluid passage formed in said housing to connect the fluid chamber with a source of pressurized fluid;

a third fluid passage, said third fluid passage formed through said piston cap portion, said third fluid passage being connected to said first fluid passage at a junction;

a pressure relief valve body, said pressure relief valve body being located at said junction of said first fluid passage and said third fluid passage, said pressure relief valve body being biased against said first fluid passage to prevent the flow of fluid through said junction;

actuation of said pressure relief valve body at a predetermined maximum pressure in said fluid chamber causing movement of said valve body from said junction to permit fluid flow out of said first fluid passage and through said third fluid passage and through said piston cap portion.

2. The hydraulic tensioner according to claim 1, wherein said pressure relief valve body is positioned between a valve spring and said first fluid passage.

3. The hydraulic tensioner according to claim 2, wherein said valve spring is positioned between said valve body and said cap portion.

4. The hydraulic tensioner of claim 3 further comprising a groove connected to an opening of said third fluid passage, said groove formed on the outside face of said cap portion of said piston.

* * * * *